United States Patent
Murschall et al.

[11] Patent Number: 5,900,294
[45] Date of Patent: May 4, 1999

[54] BIAXIALLY ORIENTED MULTILAYER POLYOLEFIN FILM WHICH CAN BE HEAT-SEALED AT LOW TEMPERATURES, PROCESS FOR THE PRODUCTION THEREOF, AND THE USES THEREOF

[75] Inventors: Ursula Murschall, Nierstein; Herbert Peiffer, Mainz; Gunter Schloegl, Kelkheim; Thomas Dries, Schwabenheim, all of Germany

[73] Assignee: Hoechst Aktiengesellschaft, Frankfurt am Main, Germany

[21] Appl. No.: 08/590,730

[22] Filed: Jan. 24, 1996

Related U.S. Application Data

[63] Continuation of application No. 08/190,606, Feb. 2, 1994, abandoned.

[30] Foreign Application Priority Data

Feb. 13, 1993 [DE] Germany .............................. 43 04 377

[51] Int. Cl.⁶ .................................................... B32B 27/08
[52] U.S. Cl. ........................ 428/34.8; 428/35.7; 428/349; 428/331; 428/330; 428/404; 428/500; 428/516 428/447; 156/244.11; 156/272.6
[58] Field of Search ..................................... 428/349, 500, 428/516, 216, 447, 331, 330, 906, 34.1, 35.7, 404, 34.8; 156/244.11, 272.6

[56] References Cited

U.S. PATENT DOCUMENTS

| | | | |
|---|---|---|---|
| 4,375,989 | 3/1983 | Mäkinen | 106/300 |
| 4,447,271 | 5/1984 | Howard et al. | 106/300 |
| 4,502,263 | 3/1985 | Crass et al. | 53/396 |
| 4,675,247 | 6/1987 | Kitamura et al. | 428/349 |
| 4,681,804 | 7/1987 | Hwo | 428/349 |
| 4,720,420 | 1/1988 | Crass et al. | 428/216 |
| 4,786,562 | 11/1988 | Kakugo et al. | 428/516 |
| 4,983,447 | 1/1991 | Crass et al. | 428/216 |
| 5,212,009 | 5/1993 | Feiffer et al. | 428/220 |
| 5,252,384 | 10/1993 | Bothe et al. | 428/212 |
| 5,254,393 | 10/1993 | Murschall et al. | 428/212 |

FOREIGN PATENT DOCUMENTS

| | | |
|---|---|---|
| 0 114 311 | 8/1984 | European Pat. Off. . |
| 0 480 282 | 4/1992 | European Pat. Off. . |
| 90 17 725 | 1/1992 | Germany . |
| 1566239 | 4/1980 | United Kingdom . |

OTHER PUBLICATIONS

Adolf Franck, "Kunststoff–Kompendium", Vogel–Buchverlag, 1984, pp. 248–255.

Ullmanns Encyklopädie der technischen Chemie, 4th Edition, vol. 12, pp. 525–555.

*Primary Examiner*—Charles Nold
*Attorney, Agent, or Firm*—Foley & Lardner

[57] ABSTRACT

A polyolefinic multilayer film comprises a base layer containing polypropylene and at least one outer layer. The outer layer comprises a $C_3/C_4$-olefin resin composition with a low degree of crystallinity and has a minimum heat-sealing temperature of below 84° C. A process for the production of the multilayer film and the use thereof are also described.

23 Claims, No Drawings

BIAXIALLY ORIENTED MULTILAYER POLYOLEFIN FILM WHICH CAN BE HEAT-SEALED AT LOW TEMPERATURES, PROCESS FOR THE PRODUCTION THEREOF, AND THE USES THEREOF

This application is a continuation of application Ser. No. 08/190,606, filed Feb. 2, 1994, abandoned.

BACKGROUND OF THE INVENTION

The invention relates to a polyolefinic multilayer film comprising a base layer containing polypropylene, and at least one outer layer.

Sensitive products (foodstuffs, chocolate and cookies) and the increasing speed of modern packaging machines require films having a low minimum heat-sealing temperature in combination with excellent passage through the machine. The prior art discloses films which have minimum heat-sealing temperatures of around 100° C., in some cases even as low as from 87 to 88° C. Numerous publications relate to improvements in the passage of these films through the machine.

EP-A-0 114 312 and EP-A-0 114 311 describe transparent or opaque polypropylene films having a minimum heat-sealing temperature of below 100° C. and good passage through the machine. These films have an outer layer comprising a mixture of $C_2/C_3/C_4$ terpolymer and $C_3/C_4$ copolymer as well as a low-molecular-weight resin, polypropylene homopolymer and polydiorganosiloxane. According to this teaching, the wide heat-sealing range of the film and the low minimum heat-sealing temperature are achieved by the olefin resin composition of copolymer and terpolymer. The minimum heat-sealing temperature is 90° C. However, the incorporation of hydrocarbon resins into the outer layer causes resin deposits on the stretching rolls during production. These deposits cause streaking, and thus, the rolls must be cleaned frequently.

EP-A-0 480 282 describes a biaxially oriented multilayer polyolefin film which can be heat-sealed at low temperatures on both sides. Its base layer contains a peroxidically degraded propylene homopolymer, and its outer layers contain mixtures of $C_2/C_3/C_4$ terpolymer and $C_2/C_3$ copolymer and also a combination of $SiO_2$ and polydiorganosiloxane. The polydialkylsiloxane has high viscosity and is added in the form of a masterbatch. The minimum heat-sealing temperature is 88° C.

The prior art also discloses heat-sealable outer layers made of $C_2/C_3$ copolymers as well as those made of $C_2/C_3/C_4$ terpolymers. All these films have minimum heat-sealing temperatures of above 100° C.

SUMMARY OF THE INVENTION

It is therefore an object of the present invention to provide an improved multilayer film, particularly a film having a low heat-sealing temperature.

A further object of the invention is to provide, according to preferred embodiments, a multilayer film which has, at least on one side, a minimum heat-sealing temperature of below about 84° C.

Another object of the invention resides in providing a film that also can pass smoothly through rapid automatic packaging machines.

Still another object is to provide a film that, in transparent embodiments, is characterized by low haze.

It is also an object of the invention to provide an improved packaging film and packaged articles using the improved packaging film according to the invention.

In accomplishing these and other objects according to the invention, there has been provided according to one aspect of the invention a polyolefinic multilayer film, comprising a base layer containing a propylene polymer and at least one outer layer, wherein the outer layer contains a $C_3/C_4$-olefin resin composition having a low degree of crystallinity and has a minimum heat-sealing temperature of below about 84° C.

According to another aspect of the invention, there has been provided a packaging film, comprising a multilayer film as defined above. According to another aspect of the invention, there has been provided a laminate, comprising a layer of the multilayer film as defined above, laminated to at least one additional layer. According to yet another aspect of the invention, there is provided a packaged article, comprising an article packaged in a multilayer packaging film as defined above.

Further objects, features and advantages of the invention will become apparent to persons of ordinary skill in the art in light of the detailed description of preferred embodiments which follows.

DETAILED DESCRIPTION OF THE PREFERRED EMBODIMENTS

According to the invention, a film of the generic type mentioned at the outset is provided, which has the features that the outer layer contains a $C_3/C_4$-olefin resin composition with a low degree of crystallinity and has a minimum heat-sealing temperature of below about 84° C. Depending on the intended area of application, the respective embodiment of the film can be transparent, matt, opaque, white or white/opaque.

The core layer of the multilayer film according to the invention essentially comprises a propylene polymer or a polypropylene mixture. The polypropylene polymer comprises predominantly (at least about 90%) propylene and has a melting point of about 140° C. or above, preferably from about 150 to 170° C. Isotactic homopolypropylene having an n-heptane-soluble content of about 6% by weight or less, based on the isotactic homopolypropylene, copolymers of ethylene and propylene having an ethylene content of 10% by weight or less, and copolymers of propylene with $C_4$-$C_8$-α-olefins having an α-olefin content of 10% by weight or less are preferred propylene polymers for the core layer. Isotactic homopolypropylene is particularly preferred. The percentages by weight given relate to the respective copolymer. The propylene polymer of the core layer generally has a melt flow index of from about 0.5 g/10 min to about 8 g/10 min, preferably from about 2 g/10 min to about 5 g/10 min, at 230° C. and a force of 21.6 N (DIN 53 735). Furthermore, a mixture of said propylene homopolymers and/or copolymers and/or other polyolefins, in particular polyolefins having 2 to 6 carbon atoms, containing at least 50% by weight, in particular at least 75% by weight, of propylene polymer is also suitable. Other polyolefins which are suitable in the polymer mixture are polyethylenes, in particular HDPE, LDPE and LLDEP, where the proportion of these polyolefins is in each case not more than about 15% by weight, based on the polymer mixture.

The propylene polymer employed in the core layer may be partially degraded by addition of organic peroxides. A measure of the degree of degradation of the polymer is the degradation factor A, which gives the relative change in melt flow index, measured in accordance with DIN 53 735, of the polypropylene, based on the starting polymer.

$$A = \frac{MFI_2}{MFI_1}$$

MFI$_1$=melt flow index of the polypropylene polymer before addition of the organic peroxide MFI$_2$=melt flow index of the peroxidically degraded polypropylene polymer In general, the degradation factor A of the polypropylene polymer employed is in the range from about 3 to 15, preferably from about 6 to 10.

Particularly preferred organic peroxides are dialkyl peroxides, where the term alkyl radical is taken to mean a conventional saturated, straight-chain or branched lower alkyl radical having up to 6 carbon atoms. Particular preference is given to 2,5-dimethyl-2,5-di(t-butylperoxy)hexane and di-t-butyl peroxide.

Opaque, white or white/opaque embodiments of the film additionally contain fillers in the core layer in an amount of from about 5 to 20% by weight, based on the total weight of the film. The fillers in the base layer are conventional inorganic and/or organic, polypropylene-incompatible materials. Inorganic fillers are preferred; particularly suitable are aluminum oxide, aluminum sulfate, barium sulfate, calcium carbonate, magnesium carbonate, silicates, such as aluminum silicate (kaolin) and magnesium silicate (talc), silicon dioxide and/or titanium dioxide, of which calcium carbonate, silicon dioxide, titanium dioxide or mixtures thereof are preferred. Calcium carbonate (chalk) is particularly preferred. Suitable organic fillers are conventional polymers which are incompatible with the polymer of the base layer, in particular those such as polyesters, polystyrenes, polyamides and halogenated organic polymers, preference being given to polyesters, such as, for example, polybutylene terephthalates. The amount of filler in the base layer, in particular the amount of CaCO$_3$, is, according to the invention, from about 5 to 20% by weight, preferably from about 10 to 15% by weight, based on the total weight of the film. The mean particle size, in particular of the CaCO$_3$, is in the range from about 2 to 5 μm, preferably in the range from about 3 to 4 μm.

Even with a relatively low filler content of from about 9 to 13% by weight, a density of the opaque embodiments of less than 0.7 g/cm$^3$ is achieved. In general, the density of the opaque film according to the invention is in the desirable range of from about 0.4 to 0.6 g/cm$^3$.

In addition to the preferred filler, calcium carbonate, a suitable further core layer additive, if present, is a pigment, such as titanium dioxide, which may be employed in the base layer in combination with CaCO$_3$. In a preferred embodiment, the pigment comprises titanium dioxide particles comprising at least about 95% by weight of rutile. The titanium dioxide particles are preferably employed with a coating of inorganic oxides, as usually used as a coating for TiO$_2$ white pigment in papers or paints for improving the lightfastness. Inorganic oxides which are particularly suitable include the oxides of aluminum, silicon, zinc and magnesium or mixtures of two or more of these compounds. They are precipitated from water-soluble compounds, for example alkali metal aluminates, in particular sodium aluminate, aluminum hydroxide, aluminum sulfate, aluminum nitrate, sodium silicate or silicic acid, in the aqueous suspension. Coated TiO$_2$ particles are described, for example, in EP-A-0 078 633 and EP-A-0 044 515, the disclosures of which are hereby incorporated by reference.

The coating may also contain organic compounds containing polar and non-polar groups. Preferred organic compounds are alkanols and fatty acids having from 8 to 30 carbon atoms in the alkyl group, in particular fatty acids and primary n-alkanols having 12 to 24 carbon atoms, and polydiorganosiloxanes and/or polyorganohydrogen siloxanes, such as polydimethylsiloxane and polymethylhydrogensiloxane.

The coating on the TiO$_2$ particles usually comprises from about 1 to 12 g, in particular from about 2 to 6 g, of inorganic oxides, and if desired additionally from about 0.5 to 3 g, in particular from about 0.7 to 1.5 g, of organic compounds, based on 100 g of TiO$_2$ particles. The coating is preferably applied to the particles in aqueous suspension. It has proven particularly advantageous for the TiO$_2$ particles to be coated with Al$_2$O$_3$ or with Al$_2$O$_3$ and polydimethylsiloxane.

The proportion of titanium dioxide in the core layer—if present—is from about 1 to 9% by weight, preferably from about 3 to 5% by weight, based on the total weight of the film. The mean particle size is very small and is preferably from about 0.15 to 0.30 μm, where the particle size stated relates to the coated particles.

TiO$_2$ is preferably used in the base layer in addition to CaCO$_3$ if a white/opaque appearance of the film is desired. Films having a base layer containing only filler usually have a hazy, opaque appearance caused by scattering processes at the vacuoles of the base layer. This should be distinguished from a white appearance, which is caused by coloring with pigments, preferably TiO$_2$.

The core layer may furthermore contain a low-molecular-weight resin whose proportion is from about 1 to 30% by weight, preferably from about 2 to 10% by weight. The softening point of the resin is from 130 to 180° C. (measured in accordance with DIN 1995-U4, corresponding to ASTM E-28), preferably from 140 to 160° C. Of the numerous low-molecular-weight resins, preference is given to hydrocarbon resins in the form of petroleum resins, styrene resins, cyclopentadiene resins and terpene resins (these resins are described in Ullmanns Encyklopadie der techn. Chemie, 4th Edition, Volume 12, pages 525 to 555). Suitable petroleum resins are described in numerous publications, such as, for example, EP-A-0 180 087. Both documents are expressly incorporated by reference here.

It is furthermore preferred to add an antistatic agent, such as, for example, tertiary aliphatic amines or glycerol monostearates, to the base layer. The type and amount of the antistatic agent are described in detail below.

In addition to the core layer, the multilayer film according to the invention comprises at least one outer layer which can be heat-sealed at low temperatures and preferably has a minimum heat-sealing temperature of below about 84° C. The outer layer which can be heat-sealed at low temperatures contains a C$_3$/C$_4$-olefin resin composition with a low degree of crystallinity, which can be characterized by the following data:

Melting point: <about 130° C., preferably from about 105 to 120° C.

Recrystallization temperature: <about 80° C., preferably from about 55 to 80° C.

Enthalpy of melting: <about 67 J/g, preferably from about 50 to 60 J/g

C$_3$ content: from about 60 to 85% by weight, preferably from about 70 to 80% by weight, in each case based on the weight of the copolymer, or from about 60 to 85 mol %, preferably from about 70 to 80 mol %, in each case based on the copolymer C$_4$ content: from about 15 to 40% by weight, preferably from about 20 to 30% by weight, in each case based on the weight of the copolymer, or from about 15 to 40 mol %, preferably from about 20 to 30 mol %, in each case based on the copolymer Particular preference is given to an olefin resin composition whose melting point is 110.6° C., whose recrystallization temperature is 60° C. and whose enthalpy of melting is 56.7 J/g. The minimum heat-sealing temperature of the outer layer is preferably in the range from about 60 to 84° C., in particular in the range from about 65 to 80° C.

In a preferred embodiment of the multilayer film, the outer layer contains the olefin resin composition with a low degree of crystallinity as the principal component, i.e., in an amount of at least about 50% by weight; the proportion thereof is preferably from about 70 to 100% by weight, in particular from about 90 to 98% by weight, in each case based on the weight of the outer layer composition. It is furthermore preferred to add an antiblocking agent to the outer layer according to the invention. The type and amount of antiblocking agents are described below.

The multilayer film has at least two layers and always comprises, as essential layers, the core layer and at least one outer layer according to the invention. Depending on the proposed application, the film may contain a further outer layer and/or further interlayers. Outer layers on both sides can in principle be identical or different in structure, composition and thickness, i.e., the second outer layer can contain either the same olefin resin composition with a low degree of crystallinity as described above or other known heat-sealable propylene polymers, such as, for example, $C_2/C_3$ copolymers, $C_2/C_3/C_4$ terpolymers or mixtures thereof, or non-heat-sealable homopolymers.

In addition, the multilayer film according to the invention may contain interlayers on one or both sides. Interlayers are particularly preferred for opaque embodiments and in this case preferably contain a pigment, such as $TiO_2$ which is described above, as an additive.

The thickness of the outer layer according to the invention which can be heat-sealed at low temperature is greater than about 0.3 $\mu$m and is generally from about 0.4 to 5 $\mu$m. The outer layer thickness is preferably in the range from about 0.6 to 3 $\mu$m, in particular in the range from about 0.8 to 1.5 $\mu$m. The overall thickness of the film depends on the intended application and can vary within broad limits. In general, the overall thickness is in the range from about 5 to 150 $\mu$m, preferably in the range from about 10 to 100 $\mu$m, in particular in the range from about 15 to 70 $\mu$m.

In order to further improve certain properties of the polypropylene film according to the invention, the core layer and/or the outer layer(s) can, in addition to the additive combination already described above, also contain further additives which do not impair the essential film properties, in an effective amount in each case, preferably lubricants and/or stabilizers and/or neutralizers which are compatible with the polymers of the core layer and the outer layer(s). All amount data given below in percent by weight (% by weight) relate to the layer or layers to which the additive has been added.

Lubricants are higher aliphatic acid amides, higher aliphatic esters, waxes and metal soaps and polydimethylsiloxanes. The effective amount of lubricant is generally in the range from about 0.1 to 3% by weight. The addition of higher aliphatic acid amides in the range from about 0.15 to 0.25% by weight in the base layer and/or outer layers is particularly suitable. A particularly suitable aliphatic acid amide is erucamide.

The addition of polydimethylsiloxanes is preferred in the range of from about 0.3 to 2.0% by weight, in particular polydimethylsiloxanes having a viscosity of from about 10,000 to 1,000,000 $mm^2/s$.

The stabilizers employed can be the conventional stabilizing compounds for ethylene, propylene and other $\alpha$-olefin polymers. The amount thereof added is from about 0.05 to 2% by weight. Phenolic stabilizers, alkali/alkaline earth metal stearates and/or alkali/alkaline earth metal carbonates are particularly suitable.

Phenolic stabilizers are preferred in an amount of from about 0.1 to 0.6% by weight, in particular from about 0.15 to 0.3% by weight, and with a molecular weight of greater than about 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

Neutralizers are preferably calcium stearate and/or calcium carbonate having a mean particle size of at most about 0.7 $\mu$m, an absolute particle size of less than about 10 $\mu$m and a specific surface area of at least about 40 $m^2/g$.

The invention furthermore relates to a process for the production of the multilayer film according to the invention by the coextrusion process which is known per se. This process involves coextruding the melts corresponding to the individual layers of the film through a flat-film die, taking off the resultant film on one or more rolls for solidification, subsequently biaxially stretching (orienting) the film, heat-setting the biaxially stretched film and, if desired, corona-treating the film on the surface layer intended for corona treatment.

The biaxial stretching (orientation) is generally carried out consecutively, preference being given to consecutive biaxial stretching in which stretching is carried out first longitudinally (in the machine direction) and then transversely (perpendicular to the machine direction).

As usual in the coextrusion process, the polymer or polymer mixture of the individual layers is first compressed and liquefied (heat plastified) in an extruder, it being possible for any additives added to be already present in the polymer. The melts are then simultaneously forced through a flat-film die, and the extruded multilayer film is taken off on one or more take-off rolls, during which it cools and solidifies.

The resultant film is then stretched longitudinally in and transversely to the extrusion direction, which results in an orientation of the molecule chains. The stretching in the longitudinal direction is preferably from about 4:1 to 7:1 and in the transverse direction is preferably from about 6:1 to 11:1. The longitudinal stretching is expediently carried out with the aid of two rolls running at different speeds, corresponding to the desired stretching ratio, and the transverse stretching is carried out with the aid of an appropriate tenter frame.

The biaxial stretching of the film is followed by heat-setting (heat treatment) thereof, during which the film is kept at a temperature of from about 120 to 170° C., preferably from about 140 to 160° C., for from about 0.5 to 10 s. The film is subsequently wound up in a conventional manner using a wind-up unit.

It has proven particularly favorable to keep the take-off roll or rolls, which also cool and solidify the extruded film, at a temperature from about 10 to 90° C., preferably from about 20 to 60° C.

In addition, the longitudinal stretching is advantageously carried out at a temperature of less than about 150° C., preferably in the range from about 110 to 140° C., and the transverse stretching is advantageously carried out at a temperature above about 140° C., preferably at from about 145 to 180° C. The film is heated to the requisite stretching temperature by means of an air heating box.

If desired, as mentioned above, the biaxial stretching can be followed by corona- or flame-treatment of one or both surfaces of the film by one of the known methods.

Corona treatment involves passing the film between two conductor elements serving as electrodes, with such a high voltage, usually an alternating voltage (about 10,000 V and 10,000 Hz) being applied between the electrodes that spray or corona discharges can occur. The spray or corona discharge causes the air above the film surface to ionize and react with the molecules of the film surface, forming polar intrusions in the essentially nonpolar polymer matrix. The treatment intensities are within usual limits, preferably from about 38 to 45 mN/m.

In flame treatment, the film is passed over a chill roll above which a gas burner is arranged. The film is pressed hard against the chill roll by a nip roll. The gas flowing out of the burner is ignited and forms flames with a length of from about 5 to 10 mm. The oxidizing part of the flame hits the film surface and causes an increase in the surface energy of the film. This too is within conventional limits.

The film according to the invention is distinguished by an unusually low minimum heat-sealing temperature, but good seal seam strength is nevertheless achieved. A packaging film is thus provided which is particularly suitable for high-speed packaging machines. However, the unusually low minimum heat-sealing temperature also opens up new areas of application, for example as a label film without additional adhesion promoters.

The invention is described in greater detail by the examples below:

EXAMPLE 1

A three-layer film is produced having an overall thickness of 20 $\mu$m and an ABC layer structure, i.e., the base layer B is surrounded by an outer layer A and an outer layer C. The film is produced by coextrusion and subsequent stepwise orientation in the longitudinal and transverse directions. Before rolling up, the film is corona-treated on side C. The surface tension on this side, as a consequence of the corona treatment, is from 39 to 40 nM/m.

All layers contain 0.12% by weight of pentaerythrityl tetrakis[4-(3,5-di-tert-butyl-4-hydroxyphenyl)propionate] (®Irganox 1010) for stabilization and 0.06% by weight of calcium stearate as neutralizer.

The base layer B essentially comprises a polypropylene homopolymer having an n-heptane-soluble content of 3.5% by weight and a melting point of 162° C. The melt flow index of the polypropylene homopolymer is 3.4 g/10 min at 230° C. and a load of 21.6 N (DIN 53 735). The base layer contains 0.15% by weight of erucamide having a melting point of from 78 to 82° C.

The polyolefinic outer layer A essentially comprises a random propylene-1-butene copolymer (®Tafmer XR 110 T) having a propylene content of 74.3 mol % and a 1-butene content of 25.7 mol %, based on the copolymer. It has a melting point of 110.6° C., a recrystallization temperature of 60° C. and an enthalpy of melting of 56.7 J/g. The outer layer A contains 0.35% by weight of the antiblocking agent silicon dioxide having a mean particle diameter of 4 $\mu$m. The thickness of the outer layer is 0.8 $\mu$m.

The polyolefinic outer layer C essentially comprises ethylene-propylene-1-butene terpolymers having a content of 3.5% by weight of ethylene, 88.5% by weight of propylene and 8% by weight of 1-butene. The terpolymer contains 0.30% by weight of silicone dioxide having a mean particle diameter of 4 $\mu$m. The thickness of the outer layer is 0.8 $\mu$m.

EXAMPLE 2

Example 1 is repeated. The polyolefinic outer layer C, which is corona-treated, essentially comprises a random propylene-1-butene copolymer having a content of 74.3 mol % propylene and 25.7 mol % of 1-butene. The copolymer contains 0.35% by weight of a silicon dioxide having a mean particle diameter of 4 $\mu$m. The thickness of the outer layer is 0.9 $\mu$m.

Comparative Example 1

Example 1 is repeated. The polyolefinic outer layer A essentially comprises an ethylene-propylene-1-butene terpolymer having a content of 3.5% by weight of ethylene, 88.5% by weight of propylene and 8% by weight of 1-butene. The outer layer contains 0.35% by weight of the antiblocking agent silicon dioxide having a mean particle diameter of 4 $\mu$m. The thickness of the outer layer is 0.8 $\mu$m.

Comparative Example 2

Example 1 is repeated. The polyolefinic outer layers A and C essentially comprise an ethylene-propylene copolymer having a content of 4.5% by weight of ethylene and 95.5% by weight of propylene. The outer layers A and C each contain 0.35% by weight of silicon dioxide having a mean particle diameter of 4 $\mu$m. Each outer layer has a thickness of 0.9 $\mu$m. The outer layer C is corona-treated, so that the surface tension of this side is between 39 and 40 mN/m.

The properties of the films of the examples and comparative examples are shown in the table below.

In order to characterize the raw materials and the films, the following measurement methods were used:

Melt Flow Index (MFI)

DIN 53 735 at a load of 21.6 N and at 230° C.

Melting Point

DSC measurement, maximum of the melting curve, heating rate 20° C./min.

Gloss

The gloss was determined in accordance with DIN 67 530. The reflector value was measured as an optical characteristic of the surface of a film. In accordance with the standards ASTM-D 523-78 and ISO 2813, the angle of incidence was set at 60° or 20°. A light beam hits the planar test surface at the set angle of incidence and is reflected or scattered thereby. The light beams incident on the photoelectronic receiver are indicated as a proportional electrical quantity. The measurement value is dimensionless and must be given together with the angle of incidence.

Seal Seam Strength at 100° C.

For the determination, two film strips 15 mm in width were laid one on top of the other and sealed at 100° C. for 0.5 sec at a pressure of 10 mm$^2$ (instrument: Brugger type NDS, sealing jaws heated on one side). The seal seam strength was determined by the T-peel method.

Determination of the Minimum Heat-sealing Temperature

Heat-sealed samples (seal seam 20 mm×100 mm) are produced using the Brugger HSG/ET sealing unit by sealing a film at different temperatures with the aid of two heated sealing jaws at a pressure of 10 N/cm² for 0.5 sec. Test strips with a width of 15 mm are cut out of the sealed samples. T seal strength, i.e., the force necessary to separate the test strips, is determined using a tensile testing machine at a peel rate of 200 mm/min, during which the seal seam plane forms a right angle with the direction of tension. The minimum heat-sealing temperature in that at which a seal seam strength of at least 0.5 N/15 mm is achieved.

TABLE

|  | Haze 4-layer [%] | Gloss measurement angle 20° | | Minimum heat-sealing temperature (15 N/cm²; 0.5 s) [° C.] | | Seal seam strength at 100° C., 1.5 N/cm², 0.5 s [N/15 mm] | |
|---|---|---|---|---|---|---|---|
|  |  | Side A | Side C | Side A | Side C | Side A/A | Side A/C |
| E1 | 19 | 110 | 108 | 74 | 112 | 2.1 | 1.4 |
| E2 | 21 | 109 | 107 | 74 | 82 | 2.1 | 1.8 |
| CE1 | 20 | 108 | 106 | 108 | 112 | no sealing | no sealing |
| CE2 | 19 | 107 | 105 | 120 | 122 | no sealing | no sealing |

E = Example
CE = Comparative example

What is claimed is:

1. A transparent polyolefinic multilayer film, comprising a base layer containing a propylene polymer and at least one outer layer, wherein the outer layer consists essentially of a $C_3/C_4$-olefin copolymer having a low degree of crystallinity and has a minimum heat-sealing temperature of below about 84° C., and wherein said copolymer has a recrystallization temperature of less than about 80° C., an enthalpy of melting of less than about 67 J/g, a $C_3$ content of 70 to 80% by weight, a $C_4$ content of 20 to 30% by weight, and a melting point of less than about 130° C.

2. A multilayer film as claimed in claim 1, wherein the minimum heat-sealing temperature is in the range from about 60 to 80° C.

3. A multilayer film as claimed in claim 1, wherein the $C_3/C_4$-olefin copolymer has a melting point of from about 105 to 120° C.

4. A multilayer film as claimed in claim 1, wherein the $C_3/C_4$-olefin copolymer has a recrystallization temperature of from about 55 to 70° C., and an enthalpy of melting of from about 50 to 60 J/g.

5. A multilayer film as claim in claim 1, wherein the $C_3/C_4$-olefin copolymer has a propylene content of from about 70 to 80 mol %, and a 1-butene content of from about 20 to 30 mol %, in each case based on the $C_3/C_4$-olefin copolymer.

6. A multilayer film as claimed in claim 5, wherein the $C_3/C_4$-olefin copolymer has a propylene content of about 70 mol %, and a 1-butene content of about 25 mol %, in each case based on the $C_3/C_4$-olefin copolymer.

7. A multilayer film as claimed in claim 1, wherein the base layer contains an antistatic agent, and the outer layer contains an antiblocking agent.

8. A multilayer film as claimed in claim 7, wherein said antistatic agent comprises a tertiary aliphatic amine, and said antiblocking agent comprises $SiO_2$ having a particle size of from about 4 to 6 µm.

9. A multilayer film as claimed in claim 1, wherein the propylene polymer in the base layer is partially degraded by peroxide.

10. A multilayer film as claimed in claim 1, further comprising at least one additional layer of polymeric material.

11. A multilayer film as claimed in claim 1, wherein said outer layer has a thickness of greater than about 0.3 µm and less than about 5 µm.

12. A packaging film, comprising a multilayer film as claimed in claim 1.

13. A packaged article, comprising an article packaged in a multilayer packaging film as defined by claim 12.

14. A multilayer film as claimed in claim 1, wherein said olefin copolymer comprises about 70–100 % by weight of said outer layer.

15. A multilayer film as claimed in claim 1, wherein said olefin copolymer comprises about 90–98 % by weight of said outer layer.

16. A multilayer film as claimed in claim 1, wherein said minimum heat-sealing temperature is from about 60 to 84° C.

17. A multilayer film as claimed in claim 1, wherein the outer layer has a thickness of from greater than 0.3 to 1.5 micrometers.

18. A multilayer film as claimed in claim 1, wherein the propylene polymer comprises an isotactic homopolymer of propylene.

19. A multilayer film as claimed in claim 1, wherein the base layer further comprises a low-molecular-weight resin having a softening point of from 130 to 180° C.

20. A multilayer film as claimed in claim 1, wherein the base layer further comprises one or more higher aliphatic acid amides.

21. A multilayer film as claimed in claim 1, further comprising a second heat-sealable outer layer opposite to the outer layer consisting essentially of said copolymer.

22. A process for the production of a multilayer film as claimed in claim 1, comprising the steps of: coextruding melts corresponding to the individual layers of the film through a flat-film die; taking off from the die a coextruded film via a take-off roll whose temperature is between about 10 and 90° C.; biaxially stretching the film at a longitudinal stretching ratio of from about 4:1 to 7:1 and a transverse stretching ratio of from about 6:1 to 11:1; and heat-setting the biaxially stretched film.

23. A process as claimed in claim 22, further comprising the step of corona-treating one side of said heat-set film.

* * * * *